United States Patent [19]

Williams

[11] Patent Number: 4,688,728

[45] Date of Patent: Aug. 25, 1987

[54] APPARATUS FOR ADAPTING REVOLVING BEATER/WHIPPER UNIT TO FOOD PROCESSOR WORKING BOWLS OF VARIOUS DIAMETERS

[75] Inventor: James E. Williams, Stamford, Conn.

[73] Assignee: Cuisinarts, Inc., Greenwich, Conn.

[21] Appl. No.: 770,503

[22] Filed: Aug. 28, 1985

[51] Int. Cl.⁴ ............................................. B02C 18/12
[52] U.S. Cl. ................... 241/101.1; 241/282.1; 366/300; 366/301
[58] Field of Search .............. 366/200, 297, 298, 299, 366/300; 241/101.1, 282.1, 282.2; 261/DIG. 16

[56] References Cited

U.S. PATENT DOCUMENTS

| | | | |
|---|---|---|---|
| 2,867,419 | 1/1959 | Heinzerling | 366/300 X |
| 3,073,579 | 1/1963 | Detrick | 366/200 |
| 3,892,365 | 7/1975 | Verdun | 241/92 |
| 3,951,351 | 4/1976 | Ernster et al. | 241/101.1 |
| 3,985,304 | 10/1976 | Sontheimer | 241/92 |
| 4,198,887 | 4/1980 | Williams, Jr. et al. | 83/356.3 |
| 4,200,244 | 4/1980 | Sontheimer | 241/282.1 |
| 4,213,570 | 7/1980 | Jones | 241/38 |
| 4,216,917 | 8/1980 | Clare et al. | 241/37.5 |
| 4,226,373 | 10/1980 | Williams | 241/37.5 |
| 4,227,655 | 10/1980 | Williams | 241/92 |
| 4,277,995 | 7/1981 | Sontheimer | 83/150 |
| 4,406,603 | 9/1983 | Williams | 425/191 |

*Primary Examiner*—Mark Rosenbaum
*Attorney, Agent, or Firm*—Parmelee, Bollinger & Bramblett

[57] ABSTRACT

A method and apparatus adapt a beater/whipper unit to be used in food processor bowls of varying diameter which have upstanding side walls wherein a revolving head of the beater/whipper unit is mountable on an upstanding central well of each working bowl. The revolving head carries a pair of closely spaced counter-rotating beaters which extend downwardly from the revolving head toward the bottom of the bowl so that the beaters are revolved around the central well by the revolving head. A deflector blade having an inclined front surface is detachably mounted on the revolving head when the beater unit is intended to be used on a working bowl having an upstanding side wall of a first predetermined large diameter. The deflector blade is inclined radially inwardly with respect to the direction of travel of the revolving head for deflecting ingredients in the bowl inward from the side wall toward the counter-rotating beaters. When the beater/whipper unit is intended to be used on a working bowl of smaller diameter, the deflector blade of the beater/whipper unit is removed and replaced with shorter counter-rotating beaters having larger diameters which thereby extend near to and are thereby revolved near the smaller diameter upstanding side wall of the smaller diameter bowl without any intervening deflector blade, thereby adapting the same beater/whipper unit to be used in food processors having different diameter bowls.

16 Claims, 9 Drawing Figures

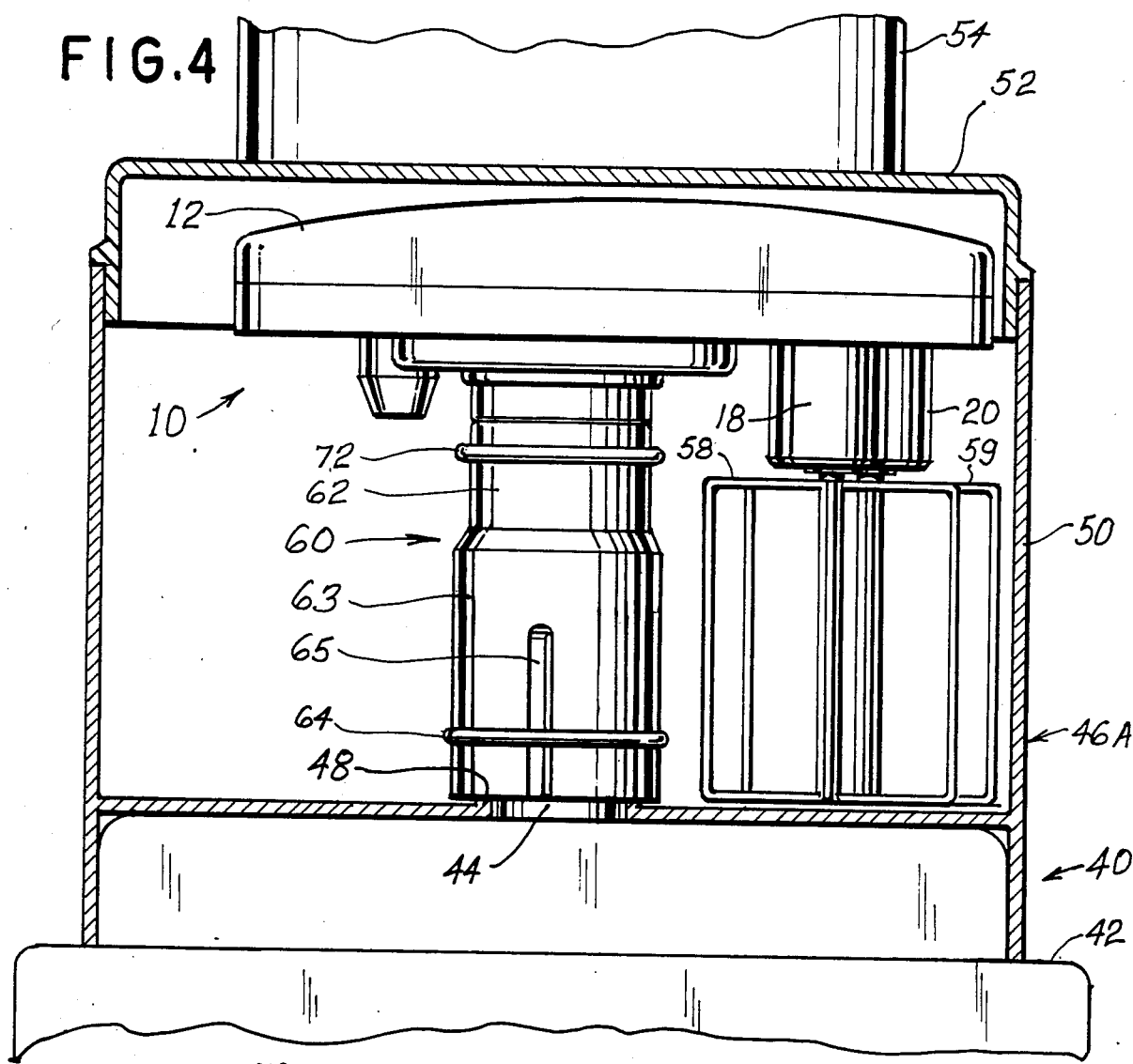
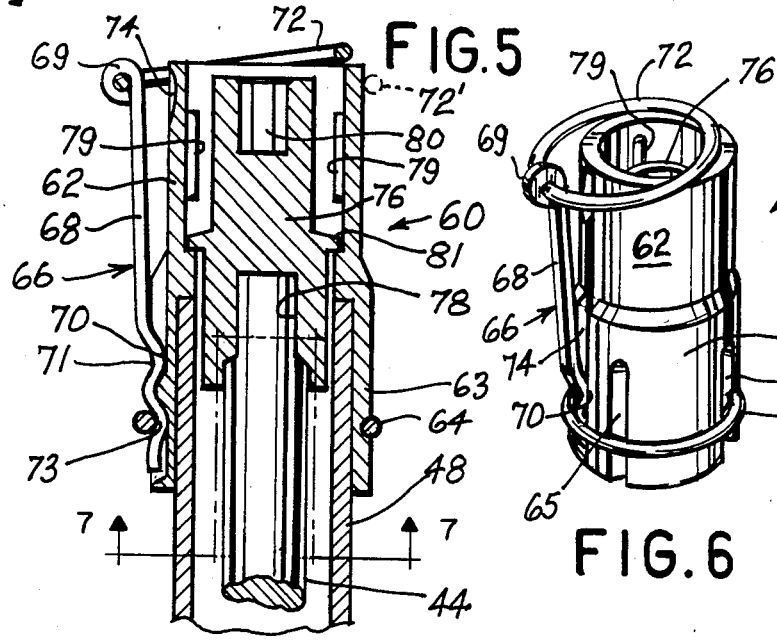
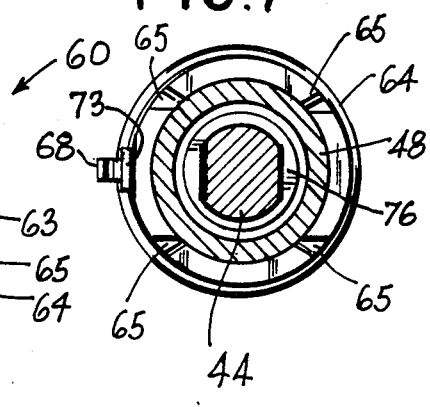

APPARATUS FOR ADAPTING REVOLVING BEATER/WHIPPER UNIT TO FOOD PROCESSOR WORKING BOWLS OF VARIOUS DIAMETERS

BACKGROUND OF THE INVENTION

This invention relates to a beater/whipper apparatus which may be attached and driven by the motor drive extending into a bowl mounted on a food processor base and more particularly to such a beater/whipper unit which may be employed in upright working bowls of various diameters thereby dispensing with the need of a separate complete unit for different size food processor bowls.

Very successful food processors marketed by Cuisinarts, Incorporated of Greenwich, Conn. employ working bowls of various sizes with a motor driven tool drive means extending into the bowl on which various selected rotary food processing tools can be engaged to be driven for performing various food processing operations in accordance with the desires of the user. A removable cover is secured over the top of the bowl during use. The cover includes a feedtube having a passageway which opens downwardly through the cover into the bowl, and the food items to be processed are placed in the feedtube and pushed down into the bowl by means of a removable food pusher which is adapted to slide down in the manner of a plunger in the feedtube. The food items are then sliced, grated or otherwise processed by the rotary tool in the bowl. The bowl carries on its periphery a push rod which forms a part of an interlock system for actuating the motor drive for driving the tool drive means only when the bowl and the cover are properly positioned on the food processor.

Additional information with respect to such food processors may be obtained by reference to U.S. Pat. Nos. 3,892,365; 3,985,304; 4,198,887; 4,200,244; 4,216,917; 4,213,570; 4,226,373; 4,227,655; and 4,277,995.

The existing electrical appliance with its motor drive in the form of a food processor base is already being utilized in connection with a pasta extruder apparatus such as is disclosed in U.S. Pat. No. 4,406,603. The utilization of this and other types of attachments which provide versatility and allow the food processor to perform functions which otherwise would require a completely separate appliance requiring additional investment and duplicating some of the equipment would be extremely desirable. The addition of other complete appliances may tax counter top space as well as requiring additional storage space which actually may not be available.

In addition, if a new attachment is to be provided, it should in effect fit all of the existing machines, for example, if a mixing or beating function is to be provided by a new attachment, a single new attachment unit should fit and operate in the various sized bowls which are currently employed, otherwise individual attachments would have to be provided for each different size bowl increasing manufacturing cost, and further complicating the marketing process in providing the right sized attachment for the specific bowl in which it is to be employed.

SUMMARY OF THE INVENTION

Accordingly, it is an object of this invention to provide a beater/whipper unit for a food processor which can be mounted in the bowl of a food processor and used with food processor bowls of various diameters.

A further object of this invention is to provide a beater/whipper attachment for a food processor employing a standard head which may be utilized on various diameter bowls with minor variations depending on the type of bowl in which the beater/whipper apparatus is utilized.

Still another object of this invention is to provide a beater/whipper unit for a food processor which enjoys all of the interlock features which are presently utilized in food processors.

A still further object of this invention is to provide a beater/whipper unit for a food processor which is compact, efficient, and complements the appearance of the food processor in which it is used.

In carrying out this invention in an illustrative embodiment thereof, a beater/whipper unit is provided as an attachment to food processors of the type having bowls with upstanding side walls of various diameters wherein the beater/whipper unit includes a revolving head mountable on an upstanding central well of each working bowl. The revolving head carries a pair of closely spaced counter-rotating beaters which extend downwardly from the revolving head toward the bottom of the bowl with the beaters revolving around the central well by the revolving head in which they are mounted. A deflector blade having an inclined front surface is detachably mounted on the revolving head when the beater/whipper unit is intended to be used on a working bowl having an upstanding side wall of a first predetermined large diameter. The deflector blade is positioned on the revolving head intermediate the counter-rotating beaters and the side wall of the bowl with the inclined front surface of the blade extending upright near the side wall and being inclined radially inward rearwardly with respect to the direction of travel of the revolving head for deflecting ingredients in the bowl inwardly away from the side wall toward the counter-rotating beaters. When the beater/whipper unit is intended to be used on a working bowl having a smaller diameter than the first predetermined large diameter bowl, the deflector blade is removed and replaced with counter-rotating beaters of shorter length and larger diameter for allowing the shorter counter-rotating beaters to extend near and thereby be revolved near the smaller diameter upstanding side wall of the bowl without any intervening deflector, thereby adapting the beater/whipper unit to be used in food processors having different diameter bowls.

Among the many advantages of this invention is to provide a beater/whipper unit which is adaptable to be used on various sized diameter bowls of a food processor, which may easily and conveniently be attached to and disengaged from the motor driven tool drive means of the food processor, and in addition is convenient and easy to mount in the bowl of the food processor for use therein.

BRIEF DESCRIPTION OF THE DRAWINGS

The invention, together with further objects, features, advantages and aspects thereof will be more fully understood from a consideration of the following description taken in conjunction with the accompanying drawings in which like elements are designated with the same reference numerals throughout the various views.

FIG. 4 is a side elevational view similar to FIG. 1 showing the use of the beater/whipper unit with the deflector blade removed and replaced with shorter-larger beaters to illustrate the application of the beater/whipper unit to a smaller diameter bowl.

FIG. 5 is a cross-sectional view illustrating the drive-coupling means and detachable mounting adapter for performing the function of coupling the beater/whipper unit of the present invention to the motor drive means of the food processor to which it is attached.

FIG. 6 is a perspective view of the detachable mounting adapter shown in FIG. 5.

FIG. 7 is a cross-sectional view taken along line 7—7 of FIG. 5.

DESCRIPTION OF THE PREFERRED EMBODIMENTS

Figure 1:
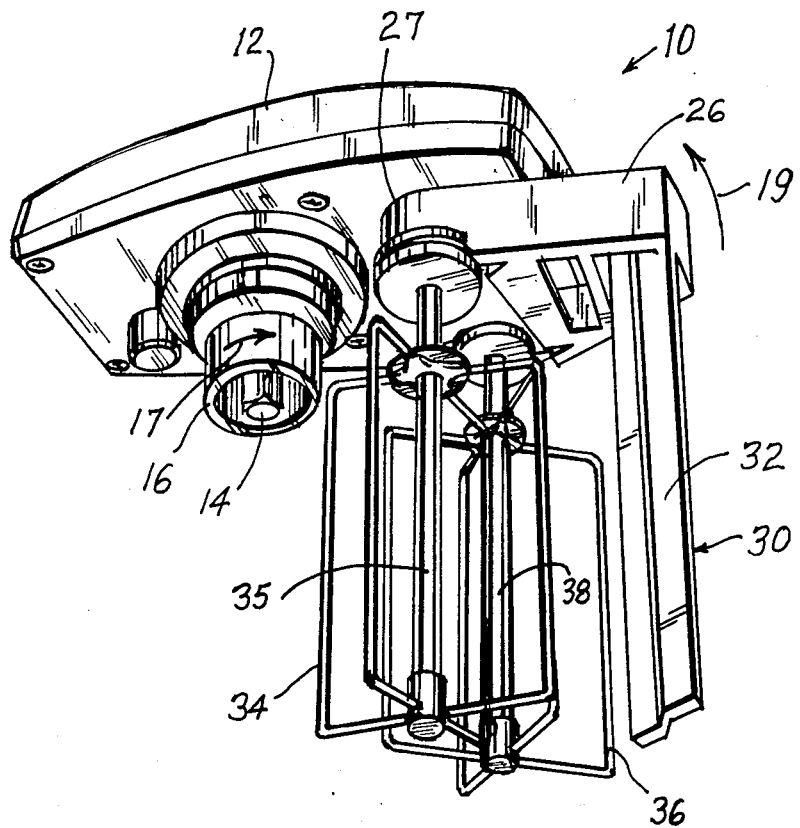
FIG. 1 is a perspective view illustrating the beater/whipper unit of the present invention having a detachable deflector blade attached in operating position thereon.

Referring now to FIG. 1, a beater/whipper unit in accordance with one aspect of the present invention is illustrated and referred to generally with the reference numeral 10. The beater/whipper unit 10 has a revolving head 12 which includes a head drive shaft 14 surrounded by a revolvably driven cylindrical mounting sleeve 16 which are adapted to be coupled to and driven by motor drive means of a food processor as will be explained hereinafter. The revolving head 12 has a pair of bosses 18 and 20 carrying rotatably driven sockets 22 and 24, respectively, therein, as will best be seen in FIG. 3. The sockets 22 and 24 are adapted to receive beater shafts 35 and 38, respectively, for rotating the beaters 34 and 36, respectively. The beaters 34 and 36 are driven in counter-rotating fashion by suitable gearing in the revolving head 12 which is not shown, as it may be any suitable gearing and forms no part of the present invention. By way of example, the revolving head is adapted when mounted in a food processor bowl to revolve at 25 rpm, while the counter-rotating beaters are driven at 1150 rpm.

Figure 3:
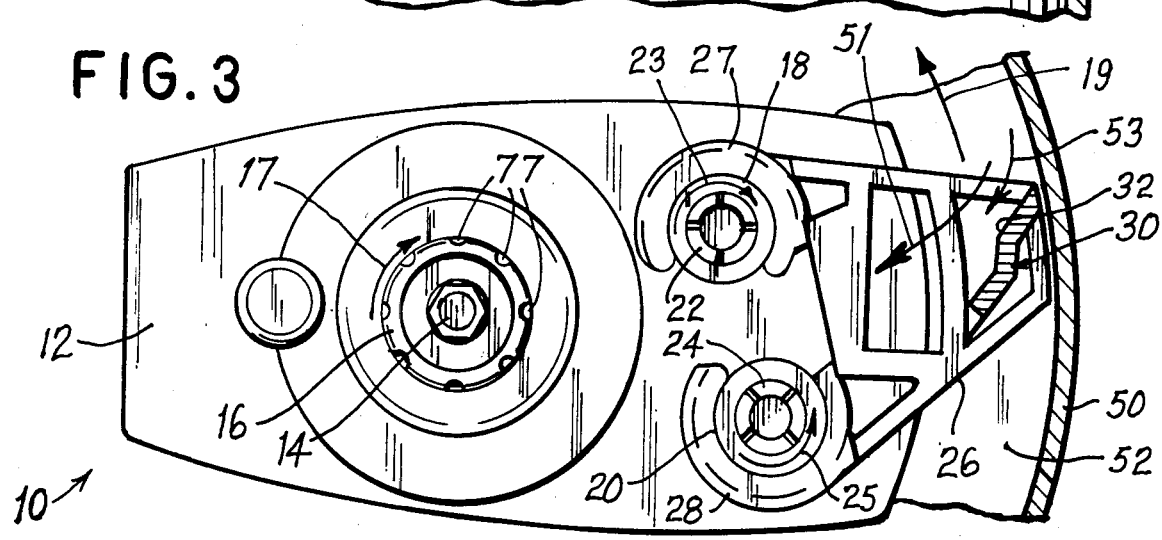
FIG. 3 is a bottom view of the beater/whipper unit 10 with the deflector blade illustrated in cross-section taken along line 3—3 of FIG. 2.

The purpose of the beater/whipper unit 10 as described with its revolving head 12 and the beaters 34 and 36 mounted therein is for attachment to the motor drive of a food processor in the bowl thereof for performing a beating and/or whipping function for the preparation of food thereby increasing the versatility and expanding the use of existing food processors. However, food processors and the bowls used thereon come in various sizes with the bowl height and diameter varying and accordingly, the beater/whipper unit 10 must accommodate different lengths of motor drive shafts as well as varying sized bowls. The illustrative embodiment in FIG. 1 illustrates the manner in which the beater/whipper unit 10 is adapted for use with larger food processors having larger diameter bowls, for example, model X manufactured by CUISINARTS, INC. of Greenwich, Conn. Accordingly, the beater/whipper unit 10 illustrated in FIG. 1 has a deflector blade 30 with an inclined front surface 32 thereon mounted on the revolving head 12 by a truncated triangular frame 26 which is removably attached by resilient C-shaped clamp hook sockets 27 and 28, which embrace the bosses 18 and 20, respectively, on the head 12 as is best seen in FIG. 3.

Figure 2:
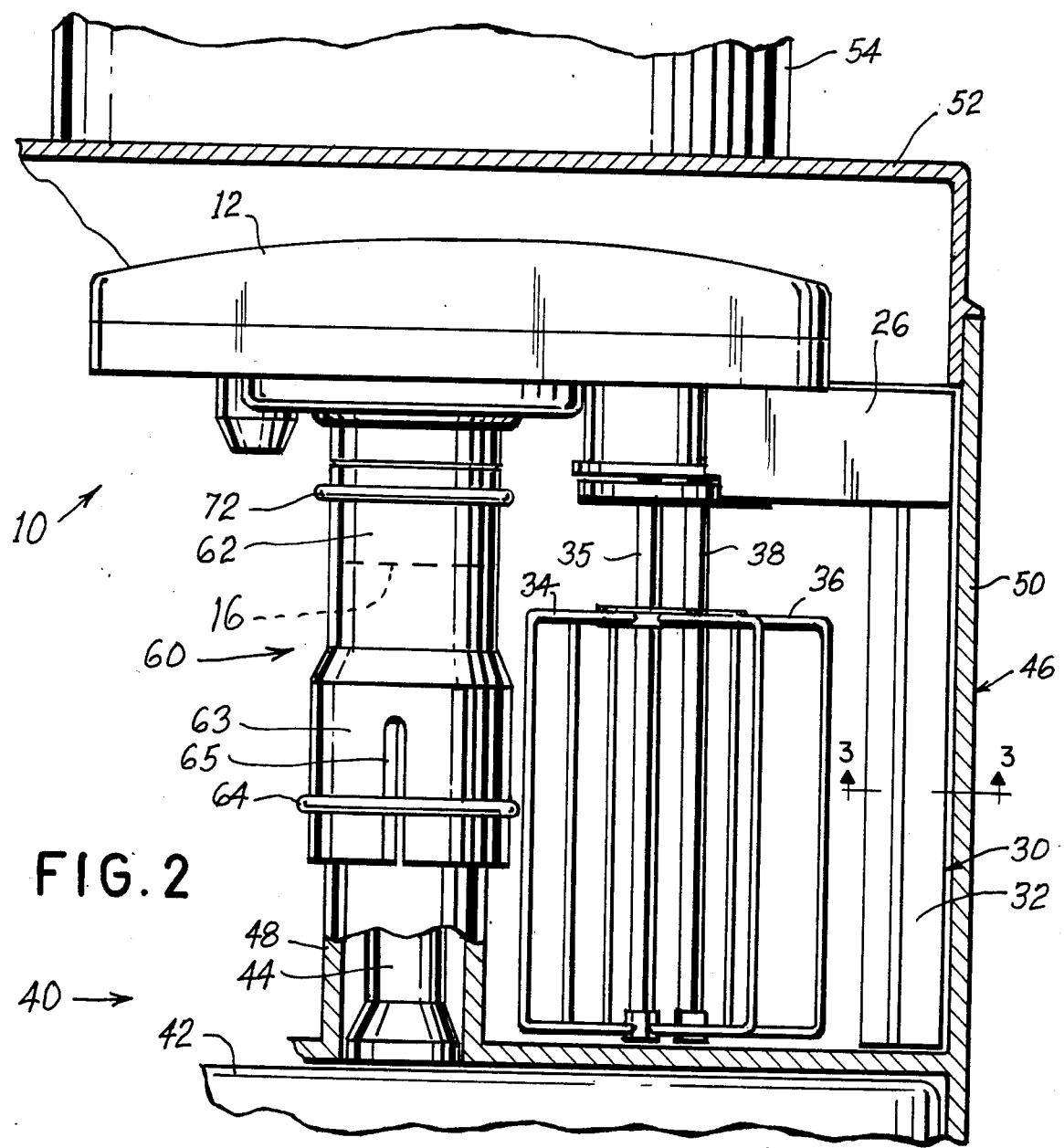
FIG. 2 is a side elevational view illustrating the beater/whipper unit of FIG. 1 mounted as an attachment in operative position on the well in a bowl of a food processor with portions of the bowl and cover of the food processor in section.

FIG. 2 illustrates the beater/whipper unit 10 mounted in the bowl 46 of a food processor 40 and driven by a motor drive shaft 44 extending up through a bowl well 48; bowl 46 is mounted on a food processor base 42. A detachable mounting, clamping adapter 60 serves to couple the well 48 (see also FIG. 5) of the bowl 46 to the cylindrical mounting sleeve 16 (FIG. 1) of the revolving head 12, while a drive shaft coupler 76 (FIG. 5) is connecting the motor-driven shaft 44 of the food processor 40 to the head drive shaft 14 of the revolving head 12 for both revolving the head 12 in the bowl 46 as well as driving the counter-rotating beater 34 and 36 mounted in the rotatably driven sockets 22 and 24 driven by the head 12.

Thus, the head drive shaft 14 (FIG. 1) is driven directly from the motor-driven shaft 44 of the food processor base 42 by means of the intervening drive shaft coupler 76. For example, the motor-driven shaft 44 typically rotates at a speed in the range from about 1720 rpm to about 1760 rpm, but its speed may be somewhat lower or higher, thereby causing the head drive shaft 14 to rotate at this same speed of about 1720 to 1760 rpm. As the head drive shaft 14 is thus being rotated at about 1720 to 1760 rpm, the gearing in the revolving head 12 causes the mounting sleeve 16 (FIG. 1) to rotate, for example, in the clockwise direction (arrow 17) as seen from below in FIG. 1, for example, at a constant revolving speed of about 18 to 30 rpm depending upon the gear ratio. It is my preference that this gear ratio in the revolving head 12 produce a constant revolving speed 17 of the mounting sleeve 16 of about 25 rpm, which speed causes the revolving head 12 to operate to advantage for a wide variety of revolving beater/whipper food preparations.

By virtue of the fact that this mounting sleeve 16 is rigidly mounted and clamped by the mounting clamping adapter 60 to the stationary well 48 of the stationary bowl 46, this sleeve 16 is thereby held rigidly stationary. Consequently, as this stationary mounting sleeve 16 is revolved relative to the head 12, as shown by the clockwise arrow 17, the head 12 itself is caused to revolve in the counterclockwise direction as seen from below (arrow 19 in FIGS. 1 and 3) at a constant revolving speed, for example at 25 rpm.

At the same time, the gearing in the head 12 causes the sockets 22 and 24 to be counter-rotating as shown in FIG. 3 by arrows 23 and 25, respectively, at a suitable beating/whipping constant speed of, for example, about 1080 to 1180 rpm. It is my preference that this constant beater speed be about 1150 rpm for optimum beater/whipper food preparing. Higher rotational speeds for the beaters tend to produce undue splatter, and lower rotational speeds are not so effective in achieving the desired aeration whipping action.

It is to be noted in FIG. 3 that the leading (forward) socket 22 with respect to the counterclockwise revolving movement 19 of the whole head 12 is intentionally positioned further from the upstanding bowl wall 50 than the trailing (rearward) socket 24 by an amount in the preferred range from about ¼ inch to about ½ inch, and optimally by about ⅜ inch. In other words, the leading beater 34 is intentionally positioned radially inwardly nearer the axis of the head drive shaft 14 than the trailing beater 36 as seen clearly in FIG. 2 due to this radially offset positioning of their respective sockets. This radially offset orientation as seen in FIG. 3 of the two sockets 22 and 24 in producing the radial offset of the leading and trailing beaters 34 and 36 is advantageous in inwardly pulling and drawing (arrow 51) the food ingredients inwardly away from the bowl wall. Thus, the radial offset of the counter-rotating beaters provides a pulling, drawing action 51 which augments the deflecting action (arrow 53) of the deflector blade 30 in deflecting food ingredients inwardly away from the surface of the upstanding cylindrical bowl wall 50.

The bowl 46 has the upstanding cylindrical side wall 50 on which is positioned the cover 52 having a feed-tube 54 extending therethrough. The cover 32 must be properly positioned and secured on the bowl 46 before the food processor 40 can be operated, as disclosed in one or more of the aforesaid patents.

In the embodiment illustrated in FIG. 2, the revolving head of the beater/whipper unit 10 is adapted to fit in a larger diameter bowl 46. When using the revolving head 12 in the larger diameter bowl as shown in FIG. 2, the detachable truncated triangular frame 26 carrying the deflector blade 30 is mounted onto the bosses 18 and 20 of the head 12 thereby positioning the deflector blade 30 on the revolving head 12 intermediate the counter-rotating beaters 34 and 36 and the side wall 50 of the bowl 46 with the inclined front surface 32 of the blade 30 extending upright near the side wall 50 and being inclined radially inward rearwardly with respect to the direction of travel indicated by the arrow 19 in FIG. 3 of the revolving head 12 for deflecting (arrow 53) ingredients which are to be whipped or beaten in the bowl 56 inwardly away from the side wall 50 toward the bite of the counter-rotating beaters 34 and 36.

In FIG. 3, it will be seen, as explained above, that the sockets for mounting the beaters are offset radially which in effect places the trailing beater 34 further out toward the side wall 50 of the bowl 46 which tends to draw (arrow 51) the material being mixed between the beaters and which drawing action 51 is enhanced by the deflecting action 53 of the blade 30. Thus, the advantageous purpose of the deflector 30 is in effect to cause the beaters 34 and 36 to operate as though they are positioned closer to the cylindrical side wall 50 of the bowl 46 than they actually are positioned, thereby permitting the beater/whipper unit 10 to be used in a larger bowl without needing a larger unit 10.

In the embodiment illustrated in FIG. 4, the application of the beater/whipper unit 10 to a smaller diameter bowl 46 is illustrated and is readily accomplished by removing the detachable triangular frame 26 carrying the deflector blade 30 from the bosses 18 and 20, and replacing the beaters 34 and 36 with different size beaters 58 and 59 which are shorter in length and somewhat larger in diameter, and further by using a shorter, detachable mounting clamping adaptor 60. A shorter drive shaft coupler 76 may also be used, depending upon the length of the motor-driven shaft 44. In the embodiment of FIG. 4, it will be seen that the counter-rotating beaters 58 and 59 extend close enough to the upstanding cylindrical side wall 50 of the bowl 46 to obviate the need for the deflector blade 30 which was required in the embodiment of FIGS. 1-3 employing a larger diameter bowl.

For an explanation of the manner in which the beater/whipper unit 10 is coupled to the motor drive of a food processor, reference is now invited to FIGS. 5-7. The detachable mounting adaptor 60 has a sleeve 62 with a lower slotted skirt 63 carrying a lower ring 64 with a clamping mechanism 66 having a lever 68 pivoting about a fulcrum point 70 and carrying an upper clamping ring 72 in an eye 69 of the lever 68. This ring 72 is illustrated in its open position in FIG. 5, and is shown dotted at 72' in its clamping position. In the detachable mounting adaptor 60 is located the drive coupler 76 (FIG. 5) having a lower socket 78 adapted to receive the splined or flattened upper end of motor-driven shaft 44 and a hexagonal upper socket 80 which is adapted to receive the hexagonal head drive shaft 14. The upper and lower sockets 80 and 78 may have any suitable shape which will snuggly fit onto the associated drive shafts 14 and 44 in a positive drive grip on such shafts, thereby providing the function of transmitting the drive from the power output shaft 44 of the food processor base 42 to the driven shaft 14 in the revolving head 12.

As will be seen in FIGS. 2, 4, and 6, the lower skirt 63 of the clamping sleeve 62 of the detachable mounting clamping adaptor 60 is axially slotted in several places at 65, thereby permitting, when the clamp mechanism 66 is open, to slip the skirt 63 in place over the bowl well 48. The bowl 46 is properly positioned on the food processor base 42 with the bowl well 48 surrounding the drive shaft 44 of the food processor 40. The clamping adaptor 60 is then clamped in place by firmly pulling inwardly and slipping the upper ring 72 over the sleeve 62 which pivots the lever 68 on the fulcrum point 70. When the upper portion of the lever 68 is pulled inwardly toward the sleeve 62 by putting the upper clamp ring 72 around the sleeve 62 as shown at 72', the lower portion of this lever 68 swings outwardly due to first-class lever motion (see-saw motion) about the fulcrum 70. Consequently, the lower clamp ring 64 is pulled tightly around the slotted skirt 63, thereby firmly clamping the slotted skirt 63 of the detachable mounting adaptor 60 onto the bowl well 48.

The fulcrum 70 is made by an indented region 71 of the lever 68. It is noted that the length of this lever 68 above the fulcrum 70 up to the upper ring eye 69 is several times, for example at least three times, longer than the length of this lever below the fulcrum down to the indentation 73 where the lower clamp ring 64 is seated. Thus, this lever 68 of the first-class (see-saw class) produces a mechanical advantage force increase of at least three-to-one due to the relative lengths of its lever arms on opposite sides of its fulcrum. Consequently, putting the upper ring 72 around the sleeve 62 as seen at 72' produces a relatively strong constrictive clamping action of the slotted skirt 63 onto the well 48.

It is noted that the sleeve 62 has a recess 74 for providing clearance for the inwardly pulled lever 68 when the upper clamp ring is clamped at 72'. The outer surface of the revolvably-driven mounting sleeve 16 (FIG. 3) has axially extending grooves 77, and the inner surface of the sleeve 62 has axially extending ribs 79 which engage in these grooves 77 for preventing the revolving sleeve 16 from slipping relative to the fixedly clamped mounting adaptor 60. The drive shaft coupler 76 (FIG. 5) has an annular shoulder or flange 81 located below the ribs 79. Thus, this coupler 76 is loosely captured by its shoulder 81 being retained by the ribs 79 so that they will not inadvertently become separated or lost from each other.

After the mounting adaptor 60 has been firmly clamped in fixed position onto the bowl well 48 by means of the ring-and-lever-operated clamping mechanism 66, the revolving head 12 is mounted in place with its beaters already installed. The grooved mounting cylinder 16 (FIG. 3) is slid down snuggly received into the ribbed bore of the sleeve 62 (FIG. 5), while the head drive shaft 14 (FIG. 1) slides down into its coupler socket 80 (FIG. 5) with the lower coupler socket 78 engaged onto the motor-driven shaft 44. The unit 10 is now fully mounted and ready to be used advantageously as a revolving beater/whipper.

During operation, the food ingredients which are to be whipped or beaten may be inserted directly into the bowl before mounting the cover, or the cover 52 may be mounted on the bowl and the ingredients fed down through the feedtube 54 therein. The food processor is turned on to perform the necessary beating or whipping function. Additional ingredients can be fed down to the beater/whipper unit 10 through the feedtube 54 as the beater/whipper unit is being operated within the bowl with its cover on. Removal of the unit 10 is easily and conveniently performed by the following reverse procedure of first removing the cover 52, then removing the revolving head 12 by lifting its grooved sleeve 16 and its drive shaft 14 from the bore of the sleeve 62 and from the upper socket 80 of the drive coupler respectively, and then releasing the clamp mechanism 66 by removing the upper clamping ring 72 from the sleeve 62, thereby releasing the clamping skirt 63 from the well 48 for permitting the removal of the sleeve 62 from the well 48. The detachable mounting adaptors 60 of various lengths with various couplers 76 therein permit the coupling of a revolving head 12 to different lengths and sizes of drive shafts 44 and to different wells 48 which may be incorporated in different food processors. Shorter, detachable mounting adaptors 60 may be provided for use of the revolving head 12 in smaller food processors having smaller bowls 46, for example, as is illustrated in the embodiment of FIG. 4.

Figure 8:
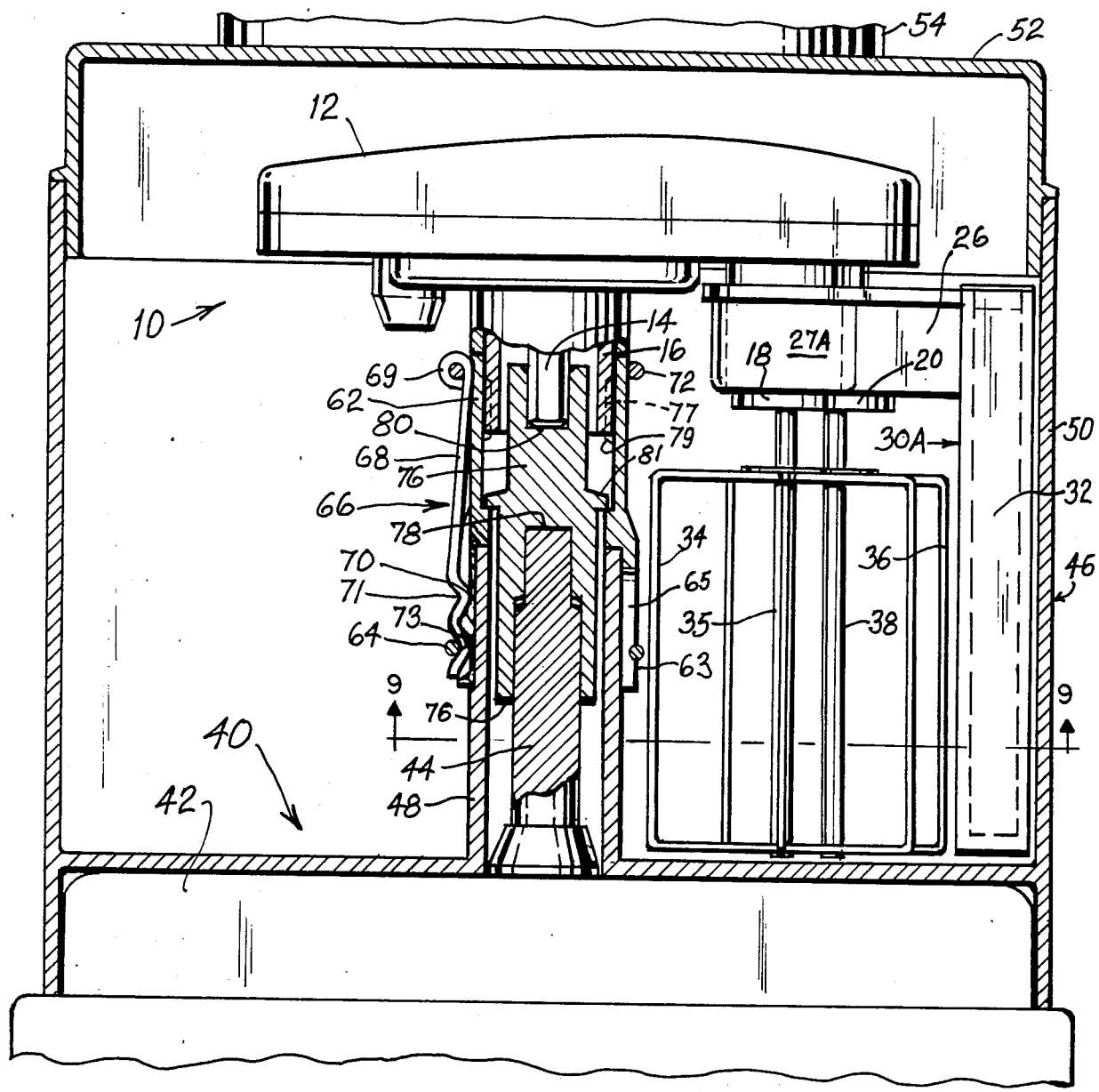
FIG. 8 is a side-elevational view of the beater/whipper unit of the present invention illustrating a cross-sectional view of the drive-coupling means and detachable mounting adapter for coupling the unit to the motor drive of the food processor, and also illustrating an alternative embodiment of the detachable deflector blade.
Figure 9:
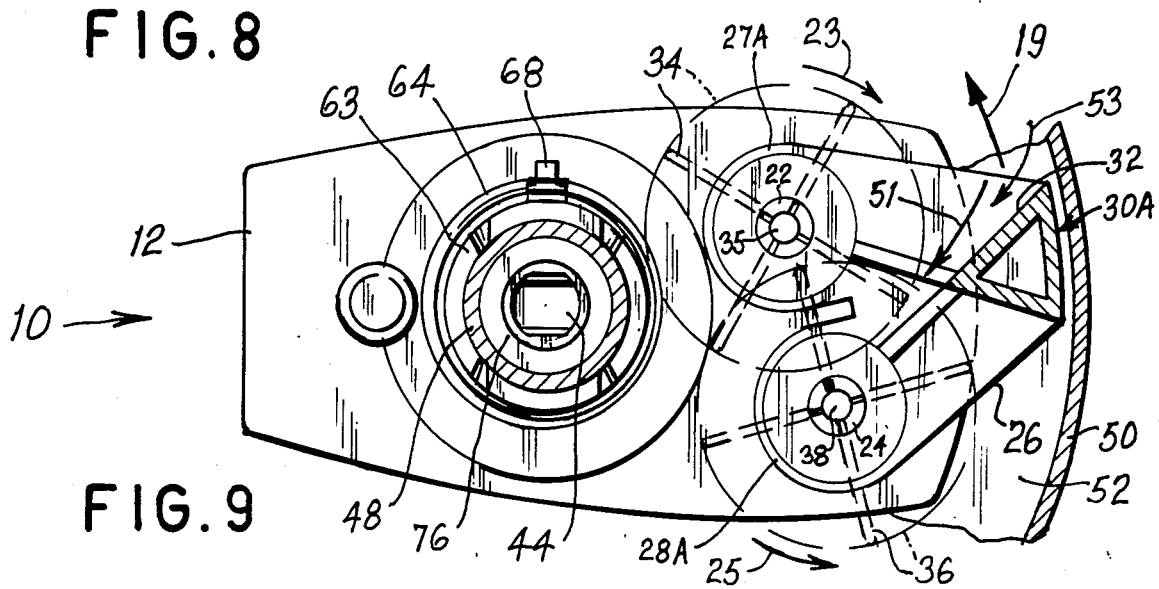
FIG. 9 is a cross-sectional view taken along line 9—9 of FIG. 8.

FIGS. 8 and 9 illustrate the attachment of the revolving head 12 to the drive shaft of a food processor in cross-section, and also illustrate an alternate deflector blade embodiment having a triangular-shaped deflector blade 30A attached to the revolving head 12 for use in a larger diameter bowl of a larger size food processor. The truncated triangular frame 26 which carries the deflector blade 30A has cylindrical sockets 27A and 28A which embrace the bosses 18 and 20, respectively. The operation and function of this deflector blade 30A is the same and for the same purpose as the deflector blade 30 illustrated in the embodiment shown in FIG. 2. The deflector blade 30A also has an inclined front surface 32 which is adapted to deflect (arrow 53) ingredients inwardly in the bowl away from hugging the upright side wall 50 for drawing food material inwardly (arrow 51) between the counter-rotating beaters 36 and 34.

The deflector blade 30A is stiffened by its hollow triangular configuration, and the deflector blade 30 is stiffened by its slight zig-zag configuration as shown in FIG. 3.

In accordance with the present invention, a single beater/whipper revolving head is adapted to be utilized for food processors of different size without requiring any different revolving head for each size. The purpose is to add versatility to existing food processors without requiring independent specially designed revolving heads for each different size food processor. In accordance with the present invention, this versatility is achieved by first providing an adapter unit for coupling the beater/whipper head to various sizes and lengths of drive shafts extending vertically upwardly and protruding out of the food processor base on which bowls of various sizes may be operatively positioned and operated thereon and rigidly clampable onto various sizes of bowl wells. The second step is to provide when necessary, a deflector blade which acts to increase the effective radius and to increase the inward drawing action of the beaters, without making the beaters so large that they cannot be effectively and efficiently operated by the revolving head. When smaller bowls are utilized slightly differently shaped beaters may be employed, which are somewhat shorter in length and a little larger in diameter. When installed such shorter wider beaters come close enough to the side walls of the bowl to insure that the ingredients which are to be mixed or beaten therein are effectively processed by the counter-rotating beaters. The beater/whipper unit and its mounting and disassembly are conveniently and easily performed.

Although CUISINART® food processors have been referred to and the beater/whipper unit described is adapted to be used with such food processor, the invention is not considered limited to that particular brand, but may be employed on any food processor in which an upstanding motor drive means extends centrally upwards through a well into a food processor bowl.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A beater/whipper unit for use in food processors of the type having upright stationary bowls with upstanding side walls of various diameters, such bowls including an upstanding stationary central well concentrically located in the bowl, and such food processors including motor drive means extending upwardly concentric within said upstanding central well, said beater/whipper unit comprising:
   a revolvable beater/whipper head,
      said revolvable beater/whipper head including head drive means and head mounting means concentric with said head drive means and encircling said head drive means,
   said head mounting means being rotated with respect to said head at a predetermined slow rate when said head drive means is rotated with respect to said head at a predetermined fast rate, a detachable mounting adapter for attaching said head mounting means stationary to such upstanding well for positioning said revolvable beater/whipper head in such bowl above said upstanding well with a portion of such beater/whipper head overhanging the region in the bowl between such upstanding well and said upstanding side wall, a detachable coupler located within said detachable mounting adaptor for coupling said motor drive means in positive driving relationship to said head drive means for rotating said head drive means at said predetermined fast rate for rotating said head mounting means at said predetermined slow rate relative to said beater/whipper head for causing said beater/whipper head whose head mounting means is attached stationary to the upstanding well to be revolved around in the bowl at said predetermined slow rate in a predetermined direction of revolution, a pair of counter-rotating beaters removably mounted in said overhanging portion of said revolving beater/whipper head with said beaters extending down into the bowl in the bowl region between such upstanding well and such upstanding side wall, and said pair of counter-rotating beaters being revolved in such bowl region at said predetermined slow rate in said predetermined direction of revolution of said beater/whipper head.

2. The beater/whipper unit as claimed in claim 1, in which:

said detachable coupler is captured within said detachable mounting adaptor for retaining said coupler therein for preventing their becoming separated from each other.

3. The beater/whipper unit as claimed in claim 1 having a detachable deflector blade with an inclined front surface removably mounted on said overhanging portion of said revolving beater/whipper head, said deflector blade when mounted on said overhanging portion of said revolving beater/whipper head extending downwardly near the upstanding side wall of the bowl intermediate said counter-rotating beaters and the side wall of the bowl with the inclined front surface of said blade being inclined radially inward rearwardly with respect to the predetermined direction of revolution of said revolving beater/whipper head for deflecting food ingredients being processed in the bowl inwardly away from the side wall toward said counter-rotating beaters.

4. The beater/whipper unit as claimed in claim 3, in which:

one of said pair of counter-rotating beaters is a leading beater and the other is a trailing beater with respect to said predetermined direction of revolution of said beater/whipper head, and said leading beater is positioned farther from the upstanding side wall of the bowl than the trailing beater by an amount in the range from about ¼ inch to about ½ inch for providing a drawing, pulling action upon food ingredients inwardly from the bowl wall and between said beaters for augmenting the deflecting by said inclined front surface of said blade.

5. The beater/whipper unit as claimed in claim 1, in which:

one of said pair of counter-rotating beaters is a leading beater and the other is a trailing beater with respect to said predetermined direction of revolution of said beater/whipper head, and said deflector blade is positioned near the upstanding side wall of the bowl about equi-distant from said counter-rotating beaters.

6. The beater/whipper unit as claimed in claim 3 wherein said revolving beater/whipper head has a pair of spaced bosses containing sockets extending downwardly therein in which said counter-rotating beaters are mounted, and a frame carrying said deflector blade being detachably mounted to said bosses on said revolving head.

7. The beater/whipper unit as claimed in claim 6 in which said frame carrying said deflector blade is mounted on said bosses with a pair of opposed resilient hooks extending from said frame.

8. The beater/whipper unit as claimed in claim 3 in which said deflector blade has a hollow triangular configuration with a curved face complementary in configuration to the said wall of the bowl and is mounted on the revolving head to move adjacent and parallel to the side wall of the bowl.

9. The beater/whipper unit as claimed in claim 1, in which:

said head drive means rotates at a speed in the range from about 1720 RPM to about 1760 RPM with respect to said beater/whipper head and said head mounting means rotates at a slow rate of about 18 to 30 RPM.

10. The beater/whipper unit as claimed in claim 1, in which:

one of said pair of counter-rotating beaters is a leading beater and the other is a trailing beater with respect to said predetermined direction of revolution of said beater/whipper head, and said leading beater is positioned farther from the upstanding side wall of the bowl than the trailing beater by an amount in the range from about ¼ inch to about ½ inch for inwardly pulling food ingredients inwardly way from the bowl wall and between said beaters.

11. The beater/whipper unit as claimed in claim 1, in which:

said detachable mounting adaptor includes clamping means engageable around such upstanding well for attaching said adaptor in clamped stationary relationship extending upwardly from such upstanding bowl, and said detachable mounting adaptor includes positive engagement means at an upper portion thereof for engaging said head mounting means for preventing rotation of said head mounting means with respect to said mounting adaptor.

12. The beater/whipper unit as claimed in claim 11, in which:

said clamping means includes a slotted sleeve fitting over such upstanding well in the bowl having a ring encircling said slotted sleeve, and means for tightening said ring around said slotted sleeve for clamping said mounting adaptor stationary on such upstanding well.

13. The beater/whipper unit as claimed in claim 12, in which:

said means for tightening said ring around said slotted sleeve includes a lever connected to said ring, said lever extending upwardly and having a fulcrum on said mounting adaptor above said ring, and another ring connected to said lever above said lever and being engageable around said upper portion of said mounting adaptor for moving the lever about said fulcrum for tightening said ring encircling said slotted sleeve.

14. The beater/whipper unit as claimed in claim 1, in which:

said head drive means is a rotatable shaft, said head mounting means is a rotatable sleeve encircling said shaft concentric therewith, said detachable mounting adaptor includes an upper socket for engaging said rotatable sleeve and a lower socket for engaging said upstanding well, clamp means associated with said lower socket for clamping said lower socket stationary on such upstanding well, and said detachable coupler within said detachable mounting adaptor includes an upper socket for engaging said rotatable shaft of said beater/whipper head and includes a lower socket for engaging said motor drive means extending upwardly within such upstanding well.

15. A beater/whipper unit for use in food processors of the type having a stationary bowl with an upstanding side wall, and including a stationary central well upstanding from the bottom of the bowl with motor drive means extending upwardly concentric within said upstanding central well, said beater/whipper unit comprising:

a beater/whipper head including head mounting means and head drive means positioned concentrically within said head drive means, said head mounting means rotating with respect to said head at a predetermined slow rate when said head drive means is rotated with respect to said head at a predetermined fast rate, detachable mounting adaptor means for attaching said head mounting means stationary to such upstanding well in a bowl for mounting said beater/whipper head above such upstanding well with a portion of said head projecting above the region in the bowl between the upstanding well and the side wall of the bowl, detachable drive coupling means positioned within said detachable mounting adaptor means for coupling said motor drive means to said head drive means in positive driving relationship therewith for rotating said head drive means at said predetermined fast rate, for rotating said stationary head mounting means relative to said beater/whipper head at said predetermined slow rate for causing said beater/whipper head to be revolved around within the stationary bowl at said predetermined slow rate in a predetermined direction of travel, a pair of counter-rotating beaters mounted in said projecting portion of the revolving head and extending down therefrom into the bowl in such region between the upstanding well and the side wall of such bowl, and said pair of counter-rotating beaters being carried by said revolving head for revolving said beaters around the upstanding well in said predetermined direction of travel in the region between the well and the side wall of such bowl.

16. The beater/whipper unit as claimed in claim 15, in which:

a detachable deflector blade with an inclined front surface is mounted to said projecting portion of the revolving beater/whipper head, said deflector blade extending down near to but spaced from the side wall of such bowl, said deflector blade extending down near to the bottom of such bowl, said deflector blade being positioned between said counter-rotating beaters and the side wall of such bowl, and said inclined front surface being inclined inwardly away from such bowl wall and rearwardly with respect to said predetermined direction of travel for deflecting food ingredients away from such bowl wall and toward said counter-rotating beaters.

* * * * *